(12) United States Patent
Branson et al.

(10) Patent No.: US 9,531,648 B2
(45) Date of Patent: *Dec. 27, 2016

(54) MANAGING DATA PATHS IN AN OPERATOR GRAPH

(71) Applicant: International Business Machines Corporation, Armonk, NY (US)

(72) Inventors: Michael J. Branson, Rochester, MN (US); Bradford L. Cobb, Cedar Park, TX (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/135,967

(22) Filed: Dec. 20, 2013

(65) Prior Publication Data

US 2015/0081879 A1 Mar. 19, 2015

Related U.S. Application Data

(63) Continuation of application No. 14/030,446, filed on Sep. 18, 2013.

(51) Int. Cl.
*H04L 12/721* (2013.01)
*G06F 17/30* (2006.01)
(Continued)

(52) U.S. Cl.
CPC ..... *H04L 49/9084* (2013.01); *G06F 17/30516* (2013.01); *H04L 45/24* (2013.01); *H04L 45/70* (2013.01)

(58) Field of Classification Search
CPC ............... G06F 167/30516; H04L 49/9084; H04L 45/70
See application file for complete search history.

(56) References Cited

U.S. PATENT DOCUMENTS 7,613,848 B2 * 11/2009 Amini ............... H04L 29/06027
370/229
7,644,110 B2 1/2010 Nishizawa et al.
(Continued)

OTHER PUBLICATIONS

Ballard et al., "IBM InfoSphere Streams: Harnessing Data in Motion", Sep. 2010. 360 pages, IBM Redbooks. http://www.redbooks.ibm.com/abstracts/sg247865.html.
(Continued)

*Primary Examiner* — Robert Beausoliel, Jr.
*Assistant Examiner* — Arthur Ganger
(74) *Attorney, Agent, or Firm* — Stosch Sabo

(57) ABSTRACT

Embodiments of the disclosure provide a method and, system for processing data such as a stream of tuples. The method can include receiving the stream of tuples to be processed by a plurality of stream operators operating on one or more computer processors. The method can include creating an overflow path that includes at least one stream operator that performs processing duplicative to at least one stream operator from the plurality of stream operators. The method can include monitoring a stream operator for a triggering condition. The method can include identifying a tuple from the stream of tuples to process on the overflow path. The method can include processing, on the overflow path, the identified tuple from the stream of tuples in response to the presence of the triggering condition.

12 Claims, 7 Drawing Sheets

(51) Int. Cl.
*H04L 12/861* (2013.01)
*H04L 12/707* (2013.01)

(56) References Cited

U.S. PATENT DOCUMENTS

| | | | |
|---|---|---|---|
| 7,697,430 | B2 | 4/2010 | Gracon et al. |
| 7,917,647 | B2 | 3/2011 | Cooper et al. |
| 8,069,190 | B2 | 11/2011 | McColl et al. |
| 8,095,690 | B2 | 1/2012 | Kashiyama et al. |
| 8,189,462 | B2 | 5/2012 | Kang et al. |
| 8,214,521 | B2 * | 7/2012 | Takagi et al. ............. 709/235 |
| 8,997,107 | B2 * | 3/2015 | Jain ............................ 718/104 |
| 2002/0089930 | A1 | 7/2002 | Aceves et al. |
| 2006/0195599 | A1 * | 8/2006 | Gedik et al. ............... 709/231 |
| 2010/0191911 | A1 | 7/2010 | Heddes et al. |
| 2010/0293535 | A1 | 11/2010 | Andrade et al. |
| 2011/0055239 | A1 * | 3/2011 | Wolf ................. G06F 17/30516 707/759 |
| 2011/0314019 | A1 * | 12/2011 | Jimenez Peris et al. ..... 707/737 |
| 2012/0017068 | A1 | 1/2012 | Leach et al. |
| 2012/0047505 | A1 * | 2/2012 | Branson ............ G06F 17/30563 718/100 |
| 2012/0218268 | A1 | 8/2012 | Accola et al. |
| 2012/0250512 | A1 | 10/2012 | Jagadeeswaran et al. |
| 2013/0031124 | A1 | 1/2013 | Santosuosso et al. |
| 2013/0198318 | A1 | 8/2013 | Branson et al. |

OTHER PUBLICATIONS

Branson et al., "Managing Data Paths in an Operator Graph," U.S. Appl. No. 14/030,446, filed Sep. 18, 2013.

Kleiminger et al., "Balancing Load in Stream Processing with the Cloud", 2011 IEEE 27th International Conference on Data Engineering Workshops (ICDEW), 2011. http://www.staff.city.ac.uk/~sbbj913//papers/smdb11-cloud_streaming.pdf.

* cited by examiner

MANAGING DATA PATHS IN AN OPERATOR GRAPH

CROSS-REFERENCE TO RELATED APPLICATIONS

This application is a continuation of co-pending U.S. patent application Ser. No. 14/030,446, filed Sep. 18, 2013. The aforementioned related patent application is herein incorporated by reference in its entirety.

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, and system for processing data. One embodiment is directed toward a method for managing a stream of tuples. The method can include receiving the stream of tuples to be processed by a plurality of stream operators operating on one or more computer processors. The method can include creating an overflow path that includes at least one stream operator that performs processing duplicative to at least one stream operator from the plurality of stream operators. The method can include monitoring a stream operator for a triggering condition. The method can include identifying a tuple from the stream of tuples to process on the overflow path. The method can include processing, on the overflow path, the identified tuple from the stream of tuples in response to the presence of the triggering condition.

Another embodiment can be directed toward a method for managing a stream of tuples. The method can include receiving the stream of tuples to be processed by a plurality of stream operators operating on one or more computer processors. The method can include monitoring a stream operator for a triggering condition. The method can include creating, responsive to a presence of the triggering condition, an overflow path that includes at least one stream operator that performs processing duplicative to at least one stream operator from the plurality of stream operators. The method can include identifying a tuple from the stream of tuples to process on the overflow path. The method can include processing an identified tuple from the stream of tuples in response to the presence of the overflow path.

Another embodiment can be directed toward a system for processing a stream of tuples with each tuple having one or more attributes. The system can include one or more processing elements operating on one or more computer processors configured to processes the attributes from the stream of tuples. Each processing element from the one or more processing elements can be configured to identify a tuple from the stream of tuples to process on an overflow path, wherein the overflow path includes at least one processing element that performs processing duplicative to another processing element from the one or more processing elements. Each processing element can be configured to process, on the overflow path, an identified tuple from the stream of tuples in response to the presence of the overflow path. The processing element can be configured to monitor one or more processing elements for a triggering condition. The processing element can be configured to create, in response to a presence of the triggering condition, the overflow path.

BRIEF DESCRIPTION OF THE DRAWINGS

Like reference numbers and designations in the various drawings indicate like elements.

DETAILED DESCRIPTION

Figure 1:
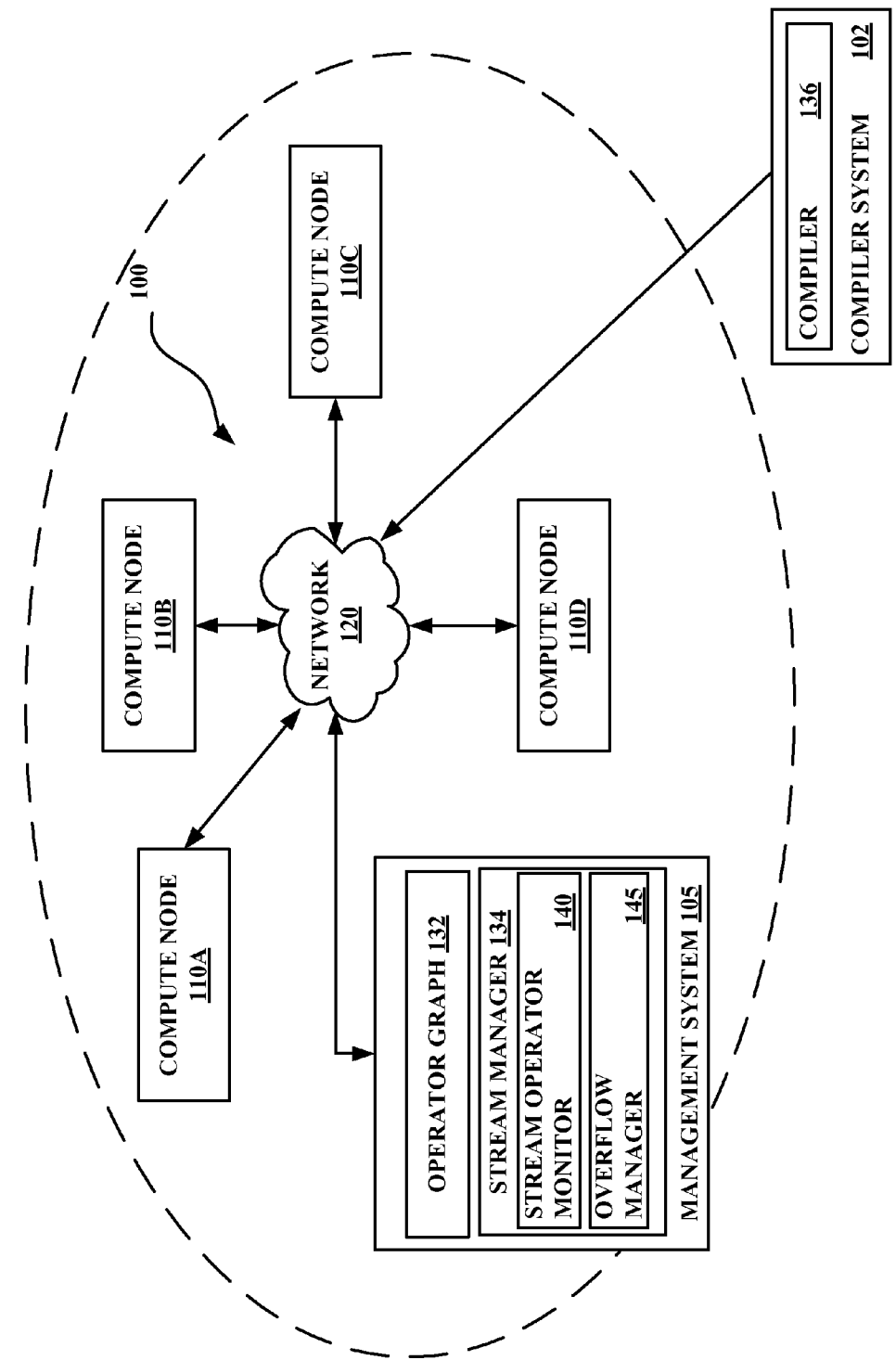
FIG. 1 illustrates a computing infrastructure configured to execute a stream computing application according to various embodiments.

Aspects of the present disclosure are generally directed to routing a stream of tuples from an original path to an overflow path in an operator graph by monitoring an operator graph for a triggering condition, creating an overflow path that performs duplicative processing of stream operators from the original path, and identifying the tuples to route to the overflow path. Although not necessarily limited thereto, embodiments of the present disclosure can be appreciated in the context of streaming data and problems relating to indicative elements that process the stream of data. Throughout this disclosure, the term stream operator may be abbreviated "S.O." or "OP"

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

Stream operators may transmit a tuple in an operator graph (described further herein). Generally, the operator graph can have a plurality of stream operators that produce a particular end result, e.g., calculate an average. The operator graph can have a primary stream operator. The primary stream operator can be a stream operator on which other stream operators depend. For example, a primary stream operator can exist when a first stream operator performs an aggregation function and produces a count for a particular attribute. A second stream operator can receive the count from the first stream operator and save the count. Thus, the first stream operator can be the primary stream operator.

The operator graph can have an original processing path, or original path. The original path can also be referred to as a primary path. The original path can have a plurality of stream operators. The original path can be the initial operator graph in various embodiments. Embodiments of the disclosure can have an overflow path for the operator graph. The overflow path can include one or more stream operators and can be used as a parallel processing path to reduce the processing load on the original path. The overflow path generally, replicates an existing portion of the operator graph and duplicates the stream operators and the connections of a stream operator on the original path. The primary stream operator can indicate the beginning of the overflow path. For example, if there is a primary stream operator, then the stream operators after the primary stream operator can be replicated into one or more overflow paths.

Stream operators in an overflow path can cease to be duplicated at the presence of certain stream operators, e.g., end stream operators. The end stream operator can be a stream operator that does not suffer from performance degradation, e.g., a bottleneck. The end of an overflow path can be marked by tuples in the queue for a stream operator. For example, if stream operators downstream from the primary stream operator have tuple queues of 30 tuples, and a stream operator further downstream has a queue of 5 tuples, then the stream operator with the queue of 5 tuples can be the end stream operator and the stream operators between the primary stream operator and the end stream operator can be duplicated into the overflow path.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 3:
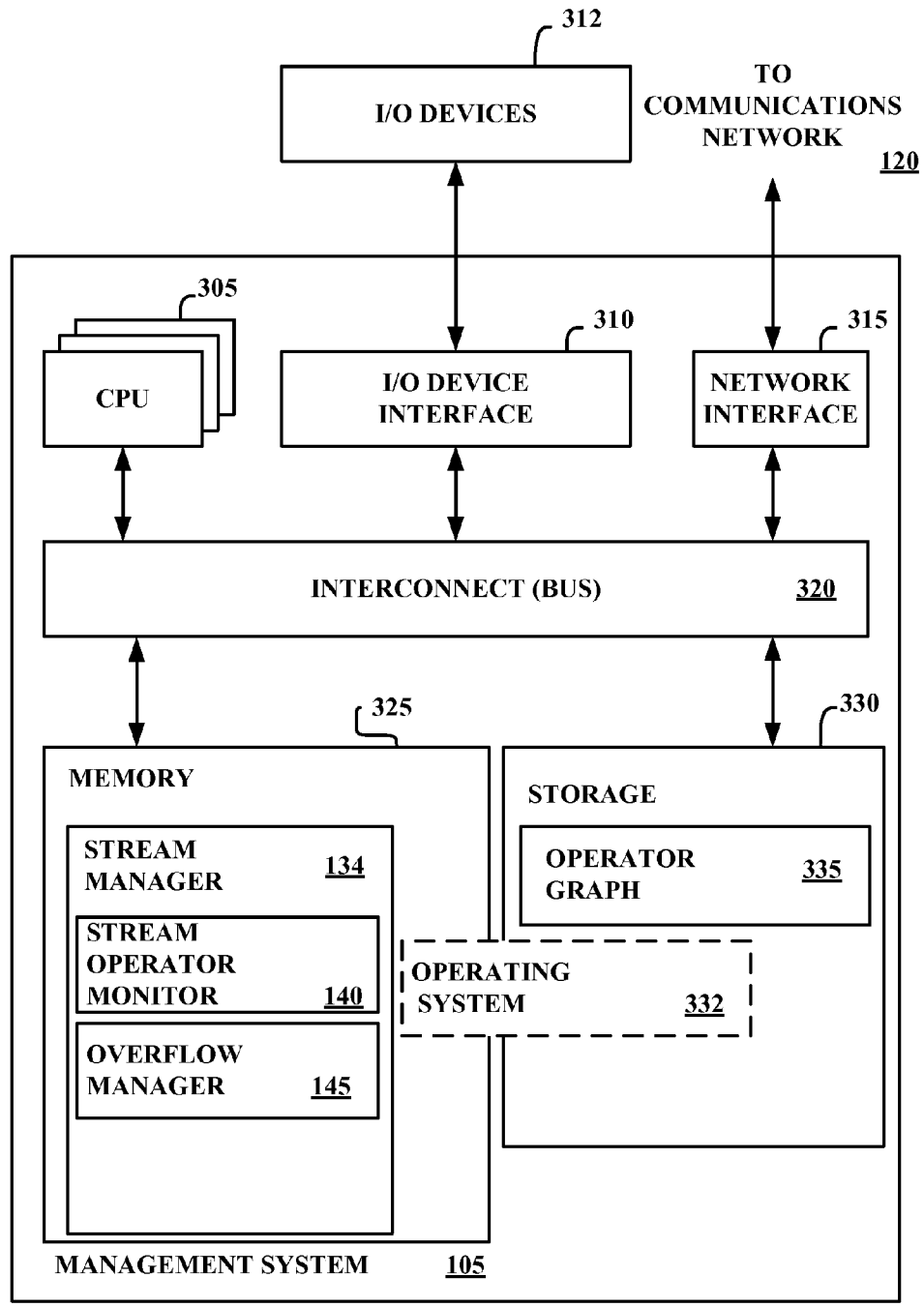
FIG. 3 illustrates a more detailed view of the management system of FIG. 1 according to various embodiments.

The management system 105 can control the management of the compute nodes 110A-110D (discussed further on FIG. 3). The management system 105 can have an operator graph 132 with one or more stream operators and a stream manager 134 to control the management of the stream of tuples in the operator graph 132. The stream manager 134 can have components such as a stream operator monitor 140 and an overflow manager 145. The stream operator monitor 140 can monitor the stream of tuples for a triggering condition.

Generally, the triggering condition can be a condition that initiates the use of the overflow path in the operator graph.

The triggering condition can be an attribute of a particular tuple from the stream of tuples. For example, if the triggering condition is an attribute, and the attribute is indicative of a group of data, e.g., the attribute value of "1" in the "order" attribute can indicate a first order of a list, then the stream operator monitor 140 can monitor for the first instance of a tuple with the "1" attribute, which can be used to initiate the overflow path.

The triggering condition can also be a threshold, with the triggering condition being a low threshold value or a high threshold value. The threshold can be defined by the tuple count or other system parameters, e.g., CPU utilization, memory utilization, or network latency. For example, the triggering condition may exist if the operator graph is operating over a determined number of tuples flowing through the primary stream operator. In various embodiments, the triggering condition can occur when the stream operator is operating below a determined processing time for the tuple.

In various embodiments, the stream operator monitor 140 can monitor for the triggering condition on one or more stream operators. Once a triggering condition is detected, a stream operator can communicate to the stream operator monitor 140 that the triggering condition has been detected. Various embodiments of the disclosure can be directed toward specific types of stream operators, e.g., a split stream operator or aggregate stream operator. The stream operator monitor 140 can communicate to the stream manager 134 so that the stream manager 134 can establish an overflow path.

The overflow manager 145 can be configured to monitor the overflow path. As mentioned herein, the overflow path can be through one or more intermediate stream operators that perform processing that duplicates the original path. The overflow path can begin at or after the primary stream operator. The overflow manager 145 can monitor the overflow path for a high traffic limit and a low traffic limit.

The high usage limit, or high limit, can correspond to a tuple count or frequency that can trigger the formation of another overflow path. The high limit can also be a triggering condition. A low usage limit, or low limit, can correspond to a tuple count or frequency that can initiate the deactivation of an overflow path. Depending on the difference between the tuple count and the low traffic limit, other actions can be taken. For example, if the tuple count is significantly below the low traffic limit, then the overflow manager 145 can communicate to the stream manager 134 and remove the overflow path.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
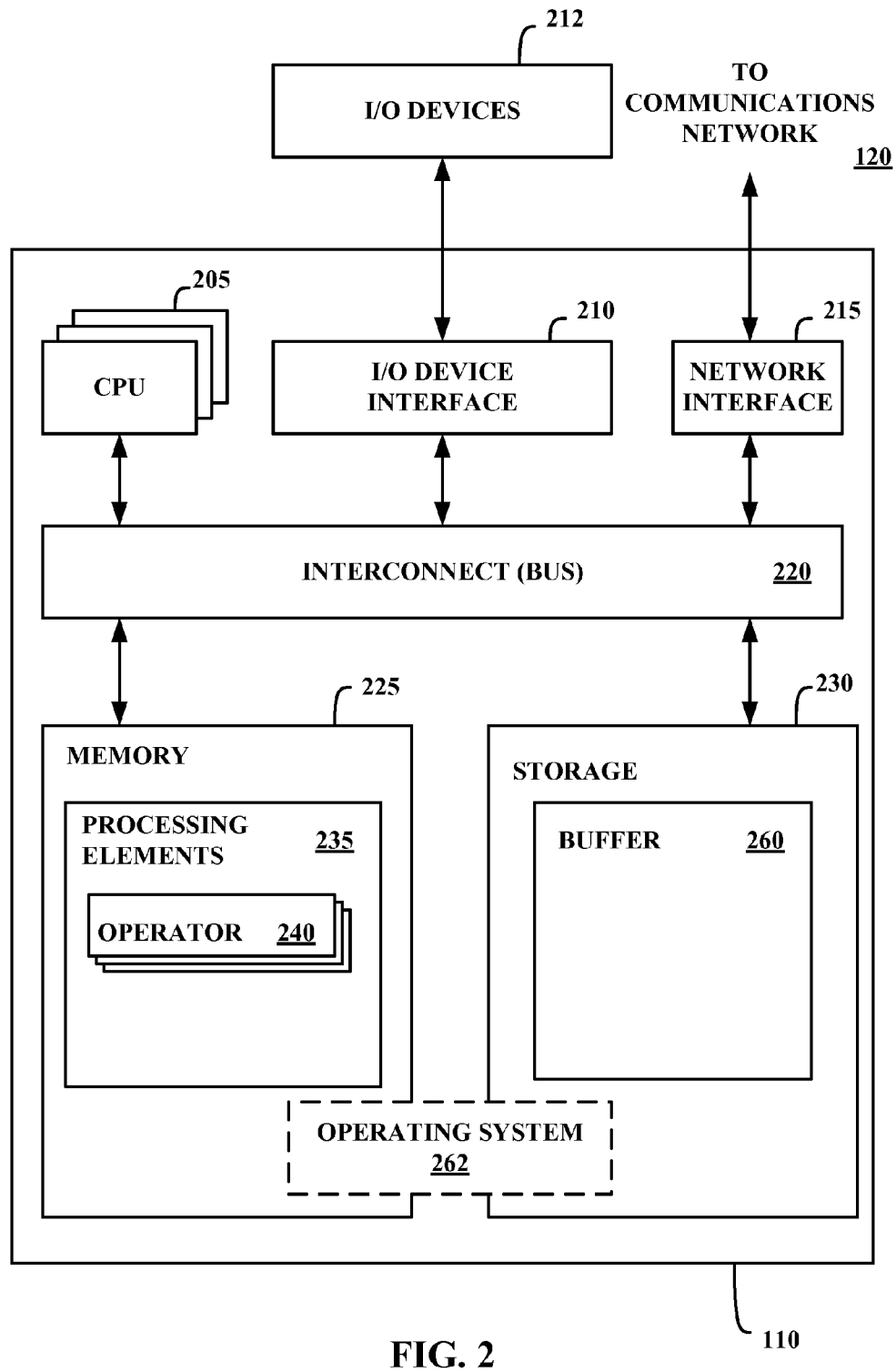
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. The stream manager 134 can have software features that manage an overflow path of the stream operator 240. In various embodiments, the stream manager 134 may have a stream operator monitor 140, and an overflow manager 145, discussed herein.

Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
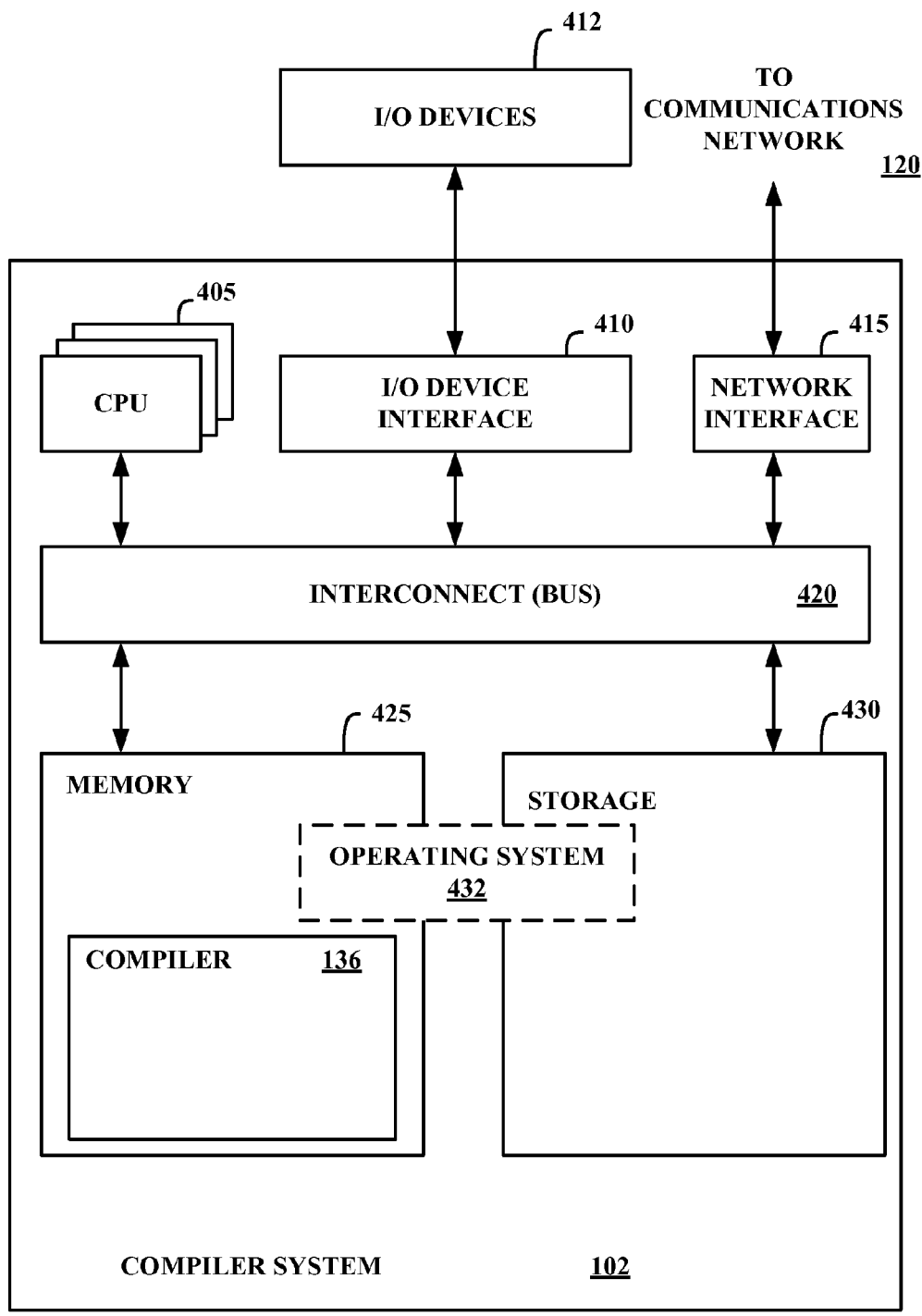
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

In various embodiments, the compiler 136 can include the windowing operation on a particular stream operator on the operator graph 335 during compile time by writing the windowing operation onto a particular stream operator. In various embodiments, the windowing operation may be included as a default and activated from the stream manager 134. The windowing operation may also be included as an optional feature for a particular stream operator and may be activated by the application.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
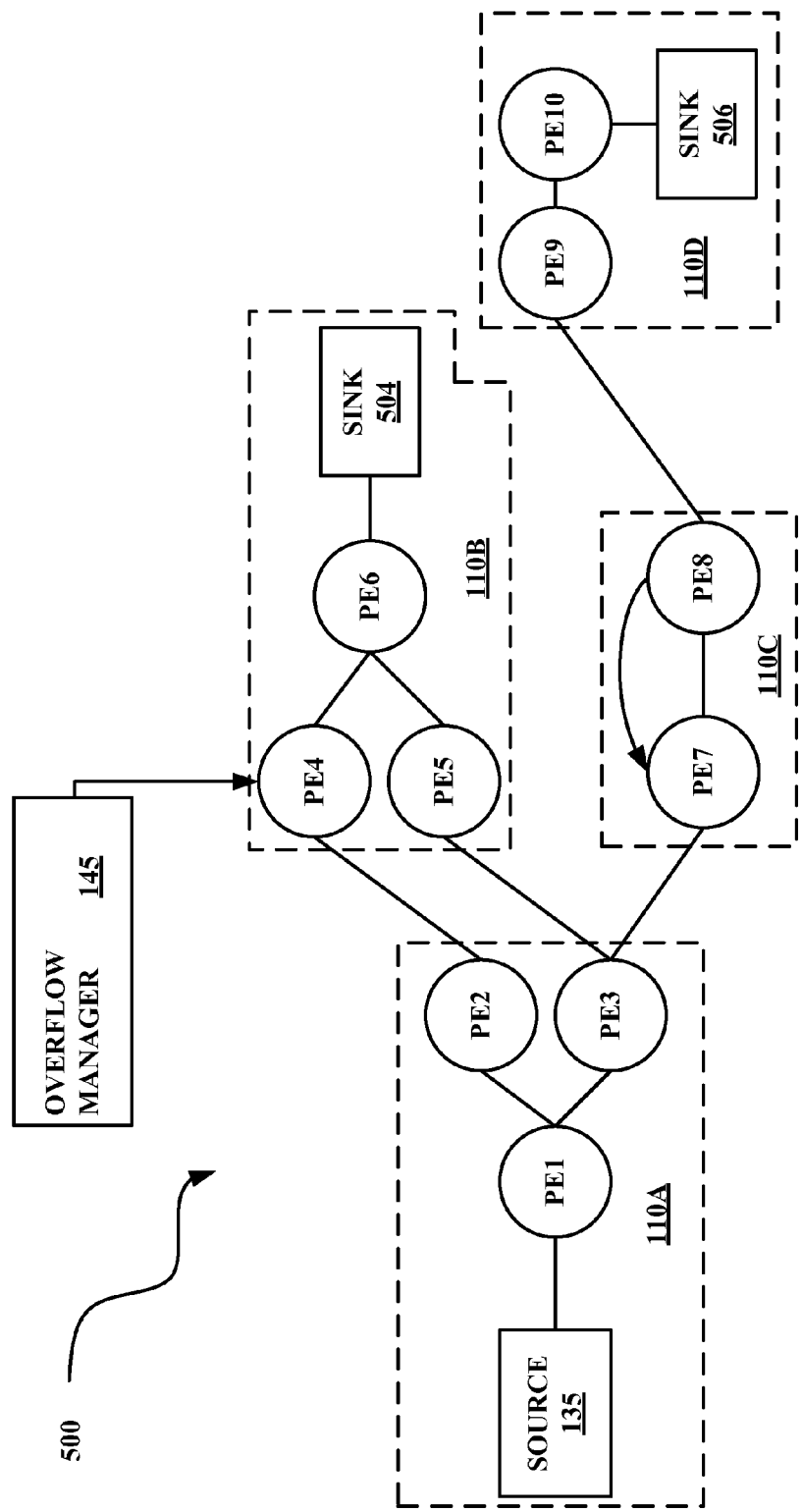
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

Each processing element may have an overflow manager 145. A processing element may further request that the stream manager 134 add an overflow path or remove an overflow path within the processing element. The operator graph 132 can encompass one or more processing elements, e.g., PE2 and PE4 from FIG. 5, which may lie on more than one compute node, e.g., 110A and 110B. In various embodiments, the overflow manager 145 can establish an overflow path that routes through another processing element. For example, if the operator graph 132 lies on a single compute node, e.g. 110A, then the overflow path can route through another compute node, e.g., 110B, to alleviate the resource burden. In cases where the stream manager 134 is offered a choice between alternative compute nodes, the stream manager 134 can choose the compute node that results in an even distribution of total processing resources.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
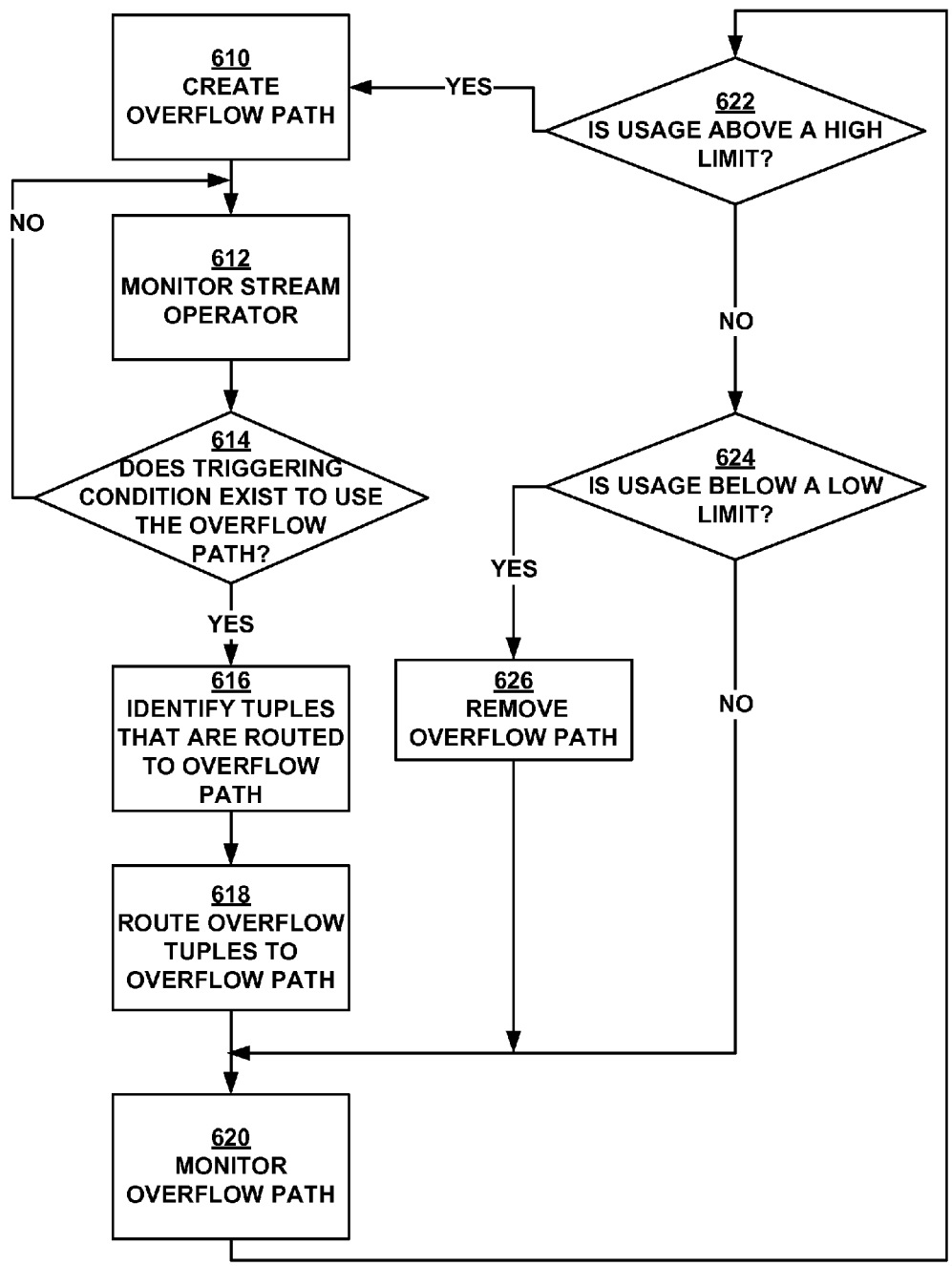
FIG. 6 illustrates a flowchart of a method for managing overflow paths according to various embodiments.

FIG. 6 illustrates a flowchart of a method 600 for managing overflow paths, according to various embodiments. Managing overflow paths of an operator graph can include monitoring the operator graph for a triggering condition to use an overflow path created from one or more duplicative stream operators and monitoring the overflow paths to ensure that an adequate number of overflow paths are created. The method 600 can begin at operation 610.

In operation 610, an overflow path can be created by the stream manager 134. The overflow path can be a duplicative portion of the original operator graph. In various embodiments, the overflow path can duplicate processing from the primary stream operator to the end stream operator. The stream manager 134 can control assignment of stream operators from the overflow path to hardware resources, e.g., compute nodes. The stream manager 134 can balance the hardware resources. For example, if the operator graph is running entirely on a first compute node and the processing resources are being constrained, then the stream manager 134 can create an overflow path that uses hardware resources of a second compute node or a combination of a second compute node and a third compute node.

In various embodiments, the overflow path in operation 610 can be static or dynamic. For instance, if the overflow path is static, then the stream operators of the overflow path do not change. The overflow path does not add or subtract stream operators in the overflow path in response to changes in the stream of data or in the original path. A static overflow path can be advantageous to save on processing resources or where the data stream is predictable such as in record analysis.

A dynamic overflow path, containing a plurality of dynamic stream operators, can change either when the underlying segment of the original path changes, or change as a function of the other routines operating on the operator graph. The dynamic overflow path can mirror the changes in the original path. For example, if the overflow path is a dynamic overflow path, and the original path deactivates a stream operator, then the dynamic overflow path can deactivate a dynamic stream operator. In various embodiments, the dynamic overflow path can include processing not present in the original path.

The stream manager 134 can have a configuration parameter that limits the number of overflow paths in a given operator graph. Thus, the number of overflow paths can be either bounded or unbounded. The stream manager 134 can also determine the number of static overflow paths or dynamic overflow paths. After the overflow path is created in operation 610, then the method 600 can continue to operation 612.

In operation 612, the stream operator monitor 140 can monitor a primary stream operator for a triggering condition. In various embodiments, the stream operator monitor 140 can monitor any stream operator in the operator graph. The stream operator monitor 140 can monitor the primary stream operator and the stream operators downstream and upstream from the primary stream operator. For example, the end stream operator can have low traffic but the primary stream operator upstream can have extremely high traffic which can indicate a triggering condition.

An advantage of monitoring upstream is to gain an insight of the incoming data before the creation of an overflow path. As discussed herein, the triggering condition can be based on the queue size of the tuple. For example, if a stream operator is backed up, then there may be a buffer to temporarily store the tuples. The size, either in the number of tuples or file size, can be used to trigger the overflow path. The application can monitor the portions of the operator graph that are likely to be backed up and select stream operators based on the history or predicted performance of the stream operator. In various embodiments, references to an application can refer to a process undertaken by the application or by a user. After the stream operator is monitored in operation 612, then the method 600 can continue to operation 614.

In operation 614, the stream operator monitor 140 can determine whether there is a triggering condition. If there is not a triggering condition, then the method 600 can continue to operation 612 where the stream operator continues to monitor for the triggering condition. Although a particular order of the overflow path creation is suggested by the method 600, the overflow path creation in operation 610 can come after the monitoring for the triggering condition in operation 612 and operation 614. For example, the stream operator monitor 140 can monitor for the triggering condition, and in response to the triggering condition being detected, the stream manager 134 creates the overflow path using duplicative stream operators. If a triggering condition is found, then the method 600 can continue to operation 616.

In operation 616, the stream operator identifies tuples that are routed to the overflow path. In a particular stream, not all of the tuples are processed down the original, i.e., non-duplicative, path. Select tuples are chosen for the overflow path based on a performance or a policy.

A stream operator or stream manager 134 can identify overflow tuples within a buffer and predict whether the tuple will have a long processing time or a short processing time. The tuple predicted to have a long processing time can be processed through an original path. For example, larger tuple file sizes can indicate a longer processing time. In various embodiments, the long processing time can be determined in relation to a processing time threshold. For example, if the stream operator or the stream manager 134 predicts that a processing time for a tuple will be 10 ms on an overflow path, and the processing time threshold for the overflow path is 5 ms, then the processing time will be beyond the processing time threshold and have a long processing time. Thus, the stream operator can route the tuple with the long processing time to an original path instead of the overflow path.

In various embodiments, the overflow manager 145 can take a balanced approach and ensure that the original path and overflow path have equivalent processing loads. For example, if there are three tuples, two tuples with processing times of 2 ms each and one tuple with a processing time of 4 ms, then the two tuples with processing times of 2 ms can be routed through the original path, and the tuple with a processing time of 4 ms can be processed in an overflow path.

The primary stream operator can determine how to distribute the incoming tuples to the overflow path. In various embodiments, the tuple can be selected for the overflow path based on the presence of a complex attribute. A complex attribute can be determined through a complexity score, according to various embodiments. For example, the tuple could have a complexity score that determines whether to select the tuple for the overflow path. The complexity score can be a numerical weighing for each tuple so that the stream operator can identify a predicted processing time. For example, the complexity score can be high if the file size is large, or the attribute requires access to a remote database.

In various embodiments, the overflow manager 145 can employ various identification methods that do not require a substantial processing load and may depend on application preferences. The overflow manager 145 can select tuples based on a particular count, e.g., identifying every third tuple to the overflow path, or according to size. The overflow manager 145 can build this into a rule that distributes tuples in a round-robin type of configuration. For example, the overflow manager 145 can distribute a first tuple to a first overflow path, a second tuple to a second overflow, and a third tuple to an original path, and repeat for subsequent tuples. If identified according to size, for example, then all tuples larger than 3 kb may be routed through the overflow path while all tuples smaller than 3 kb can be routed through the original path. The methods of identifying tuples for the overflow path explained are just some of the examples and are not meant to be exhaustive. After the tuples are identified for the overflow path by the overflow manager 145, the method 600 can continue to operation 618.

In operation 618, the overflow tuples identified in operation 616 are routed to the overflow path. According to various embodiments, operation 618 and operation 616 can be combined into the same processing analysis. In various embodiments, the tuples can be identified by a notation in their metadata or another identification method that allows a stream operator to identify the tuple and route the tuple to an overflow path. After the tuples are routed to the overflow path, then the method 600 can continue to operation 620.

In operation 620, the overflow manager 145 can monitor the stream operators in the overflow path for a high limit and a low limit. Generally, the overflow manager 145 can determine whether more or fewer overflow paths are required to optimize the processing resources of the operator graph. In various embodiments, the processing resources can be measured in absolute terms such as a tuple count or frequency of tuples through a given stream operator can be measured. The use of processing resources can also be measured in relative terms such as the tuple count relative to memory usage. Processing resources can also be defined as activity within a given period of time. For example, a low limit can be determined if the overflow path has processed a minimum number of tuples within a given period of time. After operation 620, then the method 600 can continue to operation 622.

In operation 622, the overflow manager 145 can determine whether the usage of the overflow path is above a high limit. A high limit can exist if the usage is above a value, then more overflow paths need to be created. The usage of an overflow path can be measured from the stream operator having the most usage. For example, if the first stream operator in the overflow path is receiving 30 tuples/second but the last stream operator in the overflow path is outputting 10 tuples/second, and the high limit is 15 tuples/second, then the high limit is exceeded because the 30 tuples/second is above the high limit. Another example can include using overall counts instead of rates. If the usage of the overflow path is over a high limit, then the method 600 can continue to operation 610 where an overflow path and the stream operators corresponding to the overflow path are created.

In various embodiments, an overflow path can be created, and then evaluated, one overflow path at a time. The evaluation can measure the response of the operator graph to the additional overflow path. A plurality of overflow paths can be created in one instance depending on the application parameters. For example, the application can set criteria creating one overflow path for a usage that is 10% above a high limit, but two overflow paths when the usage is 50% above a high limit. If the usage is not above a high limit, then the method 600 can continue to operation 624.

In operation 624, the overflow manager 145 can determine if the usage of a stream operator within the overflow path is below a low limit. Usage below the low limit can imply an excess of overflow paths. The low limit can be determined in a similar manner to the measurement for the high limit. For example, if a low limit is determined by an application to be 30 tuples/second, then a usage of 20 tuples/second by a stream operator within the overflow path would be within the low limit. If the overflow path is below a low limit, then the method 600 can continue to operation 626.

In operation 626, the overflow manager 145 can remove an overflow path. If there is more than one overflow path, then the overflow manager 145 can select between the overflow paths using a variety of factors. For example, if one overflow path processes 50 tuples/second, and the second overflow path processes 20 tuples/second, then the overflow manager 145 can deactivate the second overflow path, i.e., the overflow path that processes the least. The overflow manager 145 can either deactivate or remove an overflow path depending on application preferences.

In a high-tuple volume environment, the application can deactivate an overflow path in order for the overflow path to be quickly activated again. Deactivating can be particularly advantageous in a highly dynamic environment where overflow paths need to respond to rapid changes in volume. During deactivation, the overflow path can quickly be activated again. In a processing resource constrained environment, the application can remove an overflow path in order to save system resources from being allocated to supporting a deactivated overflow path.

According to various embodiments, the determination whether to deactivate or remove an overflow path can be based on the variance with the low limit. For example, if the usage is 2% below the low limit, then the overflow manager 145 can elect to deactivate the overflow path. If the usage is 50% below the low limit, then the overflow manger 145 can elect to remove the overflow path. After the overflow path is removed, method 600 can continue to operation 620. If the usage is not below a low limit, then the method 600 can continue to operation 620 without removing or deactivating the overflow path. In various embodiments, the overflow manager 145 can monitor the overflow path to determine how the overflow paths have rebalanced.

Figure 7:
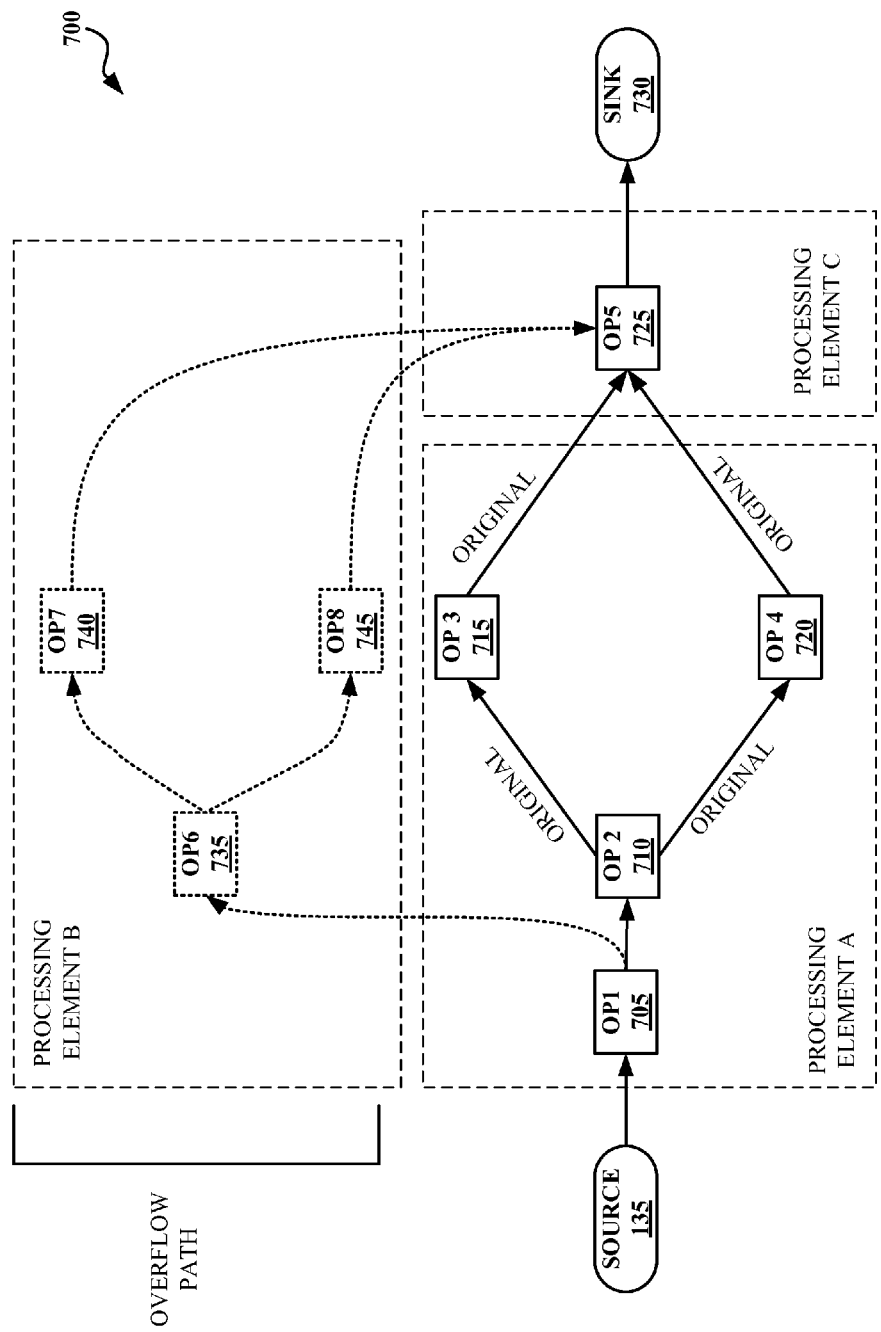
FIG. 7 illustrates an operator graph that uses the overflow path, according to various embodiments.

FIG. 7 illustrates an operator graph 700 that uses the overflow path, according to various embodiments. The operator graph 700 can be one of many operator graphs 132 depicted on FIG. 1. The operator graph 700 can have one or more tuples originating from a source 135 using the original or primary path, i.e., stream operator (OP1) 705, OP2 710, OP3 715, OP4 720, and OP5 725. In the original path, the primary operator, stream operator 705 transmits a tuple to a split operator, stream operator 710. Stream operator 710 transmits to both stream operator 715, and stream operator 720 which further transmits tuples to stream operator 725. Stream operator 725 transmits the tuple to the sink 730.

In various embodiments, an overflow path can be triggered using a triggering condition as determined by the stream operator monitor 140. As discussed herein, the triggering condition can be based off of the tuple backlog at the primary stream operator 705. In various embodiments, the triggering condition can be based off of an absence of a backlog at the receiving stream operator 725. For example, the end stream operator 725 can indicate to the stream operator monitor 140 that it is not getting enough work. The stream operator monitor 140 can examine the stream operators, 705, 710, 715, and 720 for triggering conditions. The stream operator monitor 140 can further request for more work from a stream operator that has a backlog of processing.

In various embodiments, the triggering condition can initiate the usage of the overflow path. The overflow path can include OP6 735, OP7 740, and OP8 745. OP5 725 can receive the output from both OP7 740 and OP8 745. The overflow path can be established before or after the triggering condition is detected. The stream operators that make up the overflow path can be duplicates of stream operators from the original path. For example, stream operator 735 can be a duplicate of stream operator 710, stream operator 740 can be a duplicate of stream operator 715, and stream operator 745 can be a duplicate of stream operator 720. The duplication can include the input and output ports used by the stream operators, e.g., stream operator 735 can have an input port that connects to stream operator 705, stream operator 735 can have an output port that connects to stream operator 740 and 745.

As depicted, OP1 705, OP2 710, OP3 715 and OP4 720 access the hardware resources of processing element A. OP5 725 can access the hardware resources of processing element C. OP6 735, OP7 740, and OP8 745 can access the hardware resources of processing element B. In various embodiments, the stream manager 134 can ensure that each overflow path accesses different hardware resources from each other and from the original path. The stream manager 134 can also ensure that one hardware resource, i.e., a compute node is not over utilized. For example, if processing element A is 40% utilized, and processing element B is 90% utilized, then any created overflow paths will likely not be on processing element B.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A computer-implemented method for managing a stream of tuples, comprising:
   receiving the stream of tuples to be processed by a plurality of stream operators operating on a set of one or more computer processors;
   monitoring a stream operator for a triggering condition;
   creating, responsive to a presence of the triggering condition, an overflow path that includes at least one stream operator that performs processing duplicative to at least one stream operator from the plurality of stream operators;
      wherein the overflow path comprises a dynamic overflow path, wherein a plurality of dynamic stream operators in the dynamic overflow path mirror changes in an original path defined by the plurality of stream operators from an original path;
   identifying a tuple from the stream of tuples to process on the overflow path by selecting the tuple for the overflow path based on the presence of a complex attribute of the tuple that is determined through a complexity score, the complexity score is determined by a numerical weighing for a tuple so that a stream operator can identify a predicted processing time;
   processing an identified tuple from the stream of tuples in response to the presence of the overflow path;
   monitoring at least one stream operator on the overflow path for a high traffic limit and a low traffic limit, wherein the high traffic limit comprises a processing rate at a respective stream operator that is at least 10% greater than a maximum allowable processing rate, and wherein the low traffic limit comprises a processing rate at a respective stream operator that is more than 2% below a minimum allowable processing rate;
   creating an additional overflow path responsive to detecting the high traffic limit; and
   deactivating, responsive to detecting the low traffic limit, a respective overflow path that triggers the low traffic limit.

2. The method of claim 1, wherein monitoring the stream operator includes monitoring a primary stream operator.

3. The method of claim 2, wherein the primary stream operator has the most usage.

4. The method of claim 2, wherein the triggering condition is based off of a backlog at the primary stream operator.

5. The method of claim 1, wherein the monitored stream operator is a stream operator other than a primary stream operator.

6. The method of claim 1, wherein the triggering condition is a threshold value.

7. The method of claim 6, wherein the threshold value is selected from a tuple count, and a system parameter.

8. The method of claim 1, wherein the triggering condition is an attribute value.

9. The method of claim 1, wherein the creating an overflow path includes:
   creating an overflow path operating on the set of one or more processors that support the plurality of stream operators, wherein the set of one or more processors operating the overflow path is the set of one or more processors operating the plurality of stream operators.

10. The method of claim 1, wherein the complexity score depends on the file size.

11. The method of claim 1, wherein the complexity score depends on whether an attribute of a tuple requires access to a remote database.

12. The method of claim 1, wherein the triggering condition is based off of traffic.

* * * * *